United States Patent
Rosa et al.

(10) Patent No.: US 10,028,295 B2
(45) Date of Patent: *Jul. 17, 2018

(54) METHOD AND AN APPARATUS TO CONTROL SCHEDULING

(71) Applicant: Nokia Solutions and Networks Oy, Espoo (FI)

(72) Inventors: Claudio Rosa, Randers (DK); Troels Emil Kolding, Klarup (DK); Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,467

(22) Filed: Jun. 16, 2014

(65) Prior Publication Data
US 2014/0293930 A1 Oct. 2, 2014

Related U.S. Application Data

(63) Continuation of application No. 13/498,928, filed on Mar. 29, 2012, now Pat. No. 8,805,387.

(51) Int. Cl.
*H04W 72/12* (2009.01)
*H04W 28/02* (2009.01)

(52) U.S. Cl.
CPC ... *H04W 72/1221* (2013.01); *H04W 28/0278* (2013.01); *H04W 72/1278* (2013.01)

(58) Field of Classification Search
CPC ......... H04W 72/1221; H04W 28/0278; H04W 72/127
See application file for complete search history.

(56) References Cited

U.S. PATENT DOCUMENTS

| 2007/0104135 A1 | 5/2007 | Pecen et al. | 370/329 |
| 2007/0189320 A1* | 8/2007 | Wu | H04L 1/0009 370/437 |

(Continued)

FOREIGN PATENT DOCUMENTS

| JP | 2009/506642 A | 2/2009 |
| JP | 2013506364 A | 2/2013 |

(Continued)

OTHER PUBLICATIONS

3GPP TS 44.060 V6.10.0 (Nov. 2004), "3$^{rd}$ Generation Partnership Project; Technical Specification Group GSM/EDGE Radio Access Network; General Packet Radio Service (GPRS); Mobile Station (MS)—Base Station System (BSS) Interface; Radio Link Control/Medium Access Control (RLC/MAC) protocol (Release 6)", 14 pgs.

(Continued)

*Primary Examiner* — Hassan Kizou
*Assistant Examiner* — Deepa Belur
(74) *Attorney, Agent, or Firm* — Harrington & Smith

(57) ABSTRACT

A method of scheduling resources in a communications link wherein a scheduling request is transmitted from a first entity to a second entity including determining if any of the following conditions exist: the time elapsed since the last scheduling request exceeds a designated time; the up-link requirement exceeds a predetermined level; or semi-persistent scheduling exists; and if so, suppressing the transmission and/or triggering of scheduling requests.

21 Claims, 3 Drawing Sheets

(56) References Cited

U.S. PATENT DOCUMENTS

| | | | |
|---|---|---|---|
| 2007/0201399 A1* | 8/2007 | Lee | H04W 72/1284 370/329 |
| 2007/0248099 A1* | 10/2007 | Liljestrom | H04L 1/1887 370/395.4 |
| 2009/0011698 A1 | 1/2009 | Yang et al. | |
| 2009/0061878 A1 | 3/2009 | Fischer | |
| 2009/0190485 A1* | 7/2009 | Bjorkegren | H04W 52/241 370/252 |
| 2009/0197610 A1* | 8/2009 | Chun | H04W 72/1284 455/450 |
| 2009/0238121 A1* | 9/2009 | Kotecha | H04L 1/0026 370/329 |
| 2009/0257385 A1 | 10/2009 | Meylan et al. | |
| 2009/0296663 A1 | 12/2009 | Wild | |
| 2010/0020714 A1* | 1/2010 | Rosik | H04W 36/0088 370/252 |
| 2010/0135229 A1* | 6/2010 | Lohr | H04W 72/1284 370/329 |
| 2010/0202420 A1* | 8/2010 | Jersenius | H04L 47/10 370/337 |
| 2010/0331019 A1* | 12/2010 | Bhattacharjee | H04W 52/0229 455/458 |
| 2011/0243014 A1* | 10/2011 | Lee | H04L 1/1864 370/252 |
| 2012/0039263 A1* | 2/2012 | Moberg | H04W 72/1284 370/329 |
| 2012/0100864 A1* | 4/2012 | Susitaival | H04L 1/188 455/450 |
| 2014/0301210 A1* | 10/2014 | Kim | H04W 24/10 370/241 |
| 2015/0163705 A1* | 6/2015 | Lu | H04W 36/0055 370/331 |
| 2015/0264707 A1* | 9/2015 | Golderer | H04W 72/087 370/329 |
| 2017/0251519 A1* | 8/2017 | Ohlsson | H04W 76/048 |

FOREIGN PATENT DOCUMENTS

| | | |
|---|---|---|
| RU | 2305372 C2 | 8/2007 |
| WO | WO 2007/073248 A1 | 6/2007 |
| WO | WO 2007/112762 A1 | 10/2007 |
| WO | WO 2008/030896 A2 | 3/2008 |
| WO | WO 2008/095748 A1 | 8/2008 |
| WO | WO 2008/156402 A1 | 12/2008 |
| WO | WO 2009/026739 A1 | 3/2009 |
| WO | WO 2009/115971 A | 9/2009 |
| WO | WO-2011038768 A1 | 4/2011 |

OTHER PUBLICATIONS

Tdoc R2-081767, 3GPP TSG-RAN WG2#61bis, Shenzhen, China, Mar. 31-Apr. 4, 2008, "Triggering of Scheduling Request" Philips, 3 pgs.

Tdoc R2-081468, 3GPP TSG-RAN WG2#61 bis, Shenzhen, China, Mar. 31-Apr. 4, 2008, "SR Triggering in Relation to Uplink Grants", Ericsson, 3 pgs.

\* cited by examiner

METHOD AND AN APPARATUS TO CONTROL SCHEDULING

CROSS-REFERENCE TO RELATED APPLICATIONS

The present application is a continuation of copending U.S. patent application Ser. No. 13/498,928, filed on Mar. 29, 2012, the disclosure of which is hereby incorporated by reference in its entirety. Moreover, U.S. application Ser. No. 13/498,928 itself is a continuation of U.S. national phase entry under 35 U.S.C. 371 of application PCT/EP2009/062773 filed on Oct. 1, 2009, which is also hereby incorporated by reference in its entirety.

TECHNICAL FIELD

This disclosure relates to scheduling of data between network elements such as in communication systems and has particular but not exclusive application to the control of transmission of scheduling requests between a user equipment (UE) and a base station in cellular communication systems.

BACKGROUND ART

A communication system is a facility which facilitates the communication between two or more entities such as communication devices, network entities and other nodes. A communication system may be provided by one more interconnected networks. A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

In cellular systems a network entity in the form of a base station provides a node for communication with mobile devices in one or more cells. A base station is often referred to as a 'Node B'. There are many different techniques for processing signals for transmission between the base station and the user equipment. Typically the operation of a base station apparatus and other apparatus of an access system required for the communication is controlled by a particular control entity. The control entity is typically interconnected with other control entities of the particular communication network.

A non-limiting example of a type of access architecture is a concept known as the Evolved Universal Terrestrial Radio Access (E-UTRA), which is part of the Third Generation Partnership Project Long Term Evolution (3GPP LTE) standard.

SUMMARY

The invention has particular but not exclusive application to scheduling request (SR) transmission from a user equipment to a base station, e.g. to an evolved node B (eNB), e.g. for the purpose of requesting resources and scheduling uplink packets. In E-UTRA systems, a SR is transmitted on the Physical Uplink Control Channel (PUCCH) using dedicated resources which are allocated to a User Equipment (UE), such a mobile station, on a regular basis (i.e. with a certain periodicity). The SR is transmitted as a result of the user equipment wishing to transmit data in uplink.

In addition, in E-UTRA systems, a buffer status report (BSR) is triggered in the UE if data arrives in its buffer which has a higher priority than the data previously available for transmission, or if new data arrives in an empty buffer. According to current methodology, if the UE has no allocation available on the Physical Uplink Shared Channel (to transmit data uplink) for the Time Transmission Interval (TTI) where the BSR is triggered, then a SR is triggered. When the uplink data traffic is very "bursty", characterised by the frequent transmission of small packets, e.g. in voice applications, user equipment may almost continuously transmit SRs. High levels of transmission of SRs causes problems as indicated hereinafter.

Embodiments overcome the aforementioned problems to provide efficient scheduling request control.

One embodiment of the invention provides a method comprising scheduling resources wherein a scheduling request is transmitted from a first entity to a second entity; and suppressing a transmission of the scheduling request in response to determining that a time elapsed since a last scheduling request exceeds a designated period. Another embodiment of the invention provides a computer program product comprising a non-transitory computer-readable medium storing instructions for execution by one or more processors, wherein the computer-readable medium includes instructions for performing at least the following: scheduling resources wherein a scheduling request is transmitted from a first entity to a second entity; and suppressing a transmission of the scheduling request in response to determining that a time elapsed since a last scheduling request exceeds a designated period.

Another embodiment of the invention provides a user equipment comprising one or more processors and one or more memories including computer program code, the one or more memories and the computer program code being configured, with the one or more processors, to cause the user equipment to perform at least the following: scheduling resources wherein a scheduling request is transmitted from a first entity to a second entity; and suppressing a transmission of the scheduling request in response to determining that a time elapsed since a last scheduling request exceeds a designated period.

Another embodiment of the invention provides a base station comprising one or more processors and one or more memories including computer program code, the one or more memories and the computer program code being configured, with the one or more processors, to cause the base station to perform at least the following: scheduling resources wherein a scheduling request is transmitted from a first entity to a second entity; and suppressing a transmission of the scheduling request in response to determining that a time elapsed since a last scheduling request exceeds a designated period.

Another embodiment of the invention provides a method of scheduling resources in a communications link wherein scheduling requests are transmitted from a first entity to a second entity comprising; determining if any of the following conditions exist: the time elapsed since the last scheduling request exceeds a designated period; the uplink requirement exceeds a pre-determined level; or semi-persistent scheduling grant is configured; or data arrives on a logical channel and a masking parameter is set; and if so, suppressing the transmission and/or triggering of scheduling requests.

The first network element may be a user equipment and the second entity may be a base station.

Determining if the uplink requirement exceeds a certain level may comprise identifying the start and/or end periods of data spurts in bursty traffic. The bursty traffic may be voice traffic or VoIP data packets.

The scheduling request may be suppressed if the number of Time Transmission Intervals or sub-frames that have elapsed since the previous Uplink Grant is less than a predetermined integer value.

The scheduling request may be suppressed if the number of Time Transmission Intervals or sub-frames that have elapsed since the previous scheduling request is less than a predetermined integer value.

The integer value may vary according to traffic type, base station or cell load or the periodicity of buffer status reports.

Suppressing the scheduling requests may comprise not transmitting and/or triggering a scheduling request or intermittently turning on/off the transceiver of said first entity.

In another embodiment of the invention is provided a computer program comprising program code means adapted to perform the steps of any of the above methods when the program is run on a processor and a computer readable medium comprising such a computer program.

Another embodiment of the invention provides a network element, or processor therefor, adapted to transmit or receive scheduling requests in a communications link, and having means to suppress the triggering, transmission or reception of scheduling requests if any of the following conditions exist: the time elapsed since the last scheduling request exceeds a designated period; the uplink requirement exceeds a certain predetermined level; semi-persistent scheduling grant is configured; or, data arrives on a logical channel and a masking parameter is set.

The network element may be a user equipment or base station and may have means to send/receive scheduling requests via the Physical Control Uplink Channel of an E-UTRA system.

The network element may have means to analyse the uplink traffic pattern to identify uplink requirement and/or means to identify the start and/or end of data spurts in bursty traffic. The bursty traffic may be voice traffic or VoIP data packets.

The network element may have means to suppress scheduling request(s) if the number of Time Transmission Intervals or sub-frames that have elapsed since the last Uplink Grant is less than a predetermined integer value.

The network element or processor therefor, may have means to suppress scheduling requests if the number of Time Transmission Intervals or sub-frames that have elapsed since the previous scheduling request is less than a predetermined integer value.

The means to suppress scheduling requests comprises means to intermittently turn/off off its transceiver.

The integer value may vary according to traffic type, base station or cell load or the periodicity of buffer status reports.

BRIEF DESCRIPTION OF THE DRAWINGS

For a better understanding of the present invention and how the same may be carried into effect, reference will now be made by way of example only to the accompanying drawings in which.

DETAILED DESCRIPTION

Figure 1:
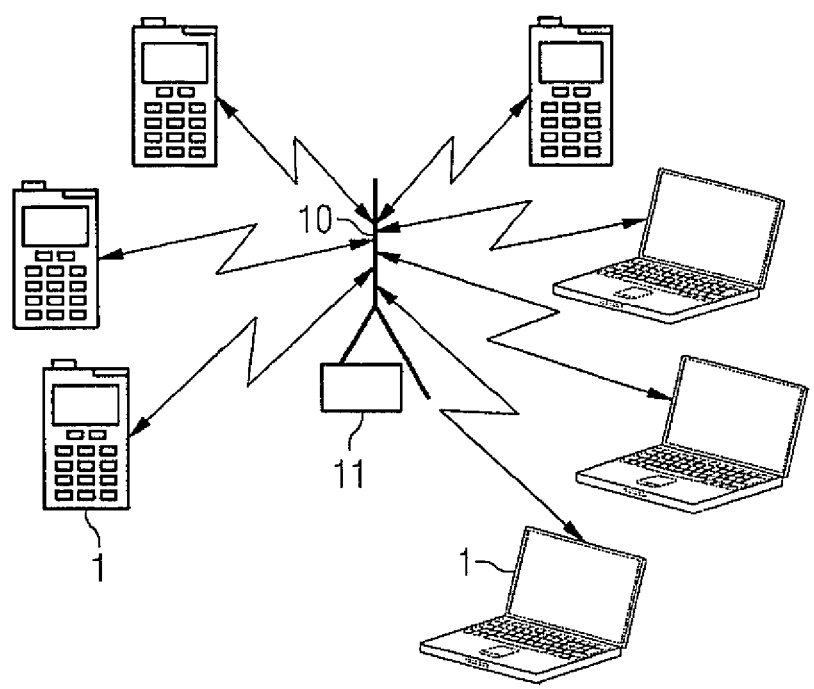
FIG. 1 shows a schematic presentation of a communication system wherein the invention may be embodied.

Before explaining in detail a few exemplifying embodiments, a brief explanation of wireless access is given with reference to FIG. 1 showing a communication system providing wireless communications to a plurality of communication devices 1. A communication device 1, for example a mobile user device, or equipment or a relay node, can be used for accessing various services and/or applications provided via the wireless communication system. A communication device can typically access wirelessly a communication system via at least one wireless transmitter and/or receiver node 10 of an access system. Non-limiting examples of access nodes are a base station of a cellular system, for example a 3G WCDMA Node B, an enhanced Node B (eNB) or relay node of 3GPP LTE (long term evolution), a base station of a wireless local area network (WLAN) and a satellite station of a satellite based communication system. The communication devices 1 may also communicate directly with each other.

The communications may be arranged in various manners based on an appropriate radio access technology or technologies. The access is provided via radio channels also known as access channels. Each communication device 1 may have one or more radio channels open at the same time. Each communication device may be connected to more than one base station 10 or similar entity. Also, a plurality of communicate devices may communicate with a base station or similar, and/or attempt to access the communication system via the same base station. A plurality of communication devices may also share a channel. For example, to start communications or to connect to a new access system, a plurality of communications devices may attempt to make the initial contact via a single channel, for example via a random access channel (RACH). The attempts to access may be made substantially at the same time.

The base station 10 of the access system can be connected to other parts of the communication system via appropriate connections, for one or more appropriate gateway nodes. These are not shown for clarity. A base station is typically controlled by at least one appropriate controller apparatus (this is true for GSM and WCDMA. However in LTE and WiMAX there is no controller anymore, but control functionality is distributed to appropriate network elements such as general access nodes, base stations, nodeB's, eNBs, AP's) generally denoted by 11 in FIG. 1. The controller apparatus 11 can be provided for managing of the operation of the base station and/or communications via the base station. The controller apparatus is typically provided with memory capacity and at least one data processor. Various functional entities may be provided in the controller by means of the data processing capability thereof. The functional entities provided in the base station controller may provide functions relating to radio resource control, access control, packet data context control, relay control and so forth.

A communication device 1 may be used for various tasks such as making and receiving phone calls, for receiving and sending data from and to a data network and for experiencing, for example, multimedia or other content. For example, a communication device may access applications provided via a telephone network and/or a data network, such as applications that are provided based on the Internet Protocol (IP) or any other appropriate protocol. An appropriate mobile communication device may be provided by any device capable of at least sending and/or receiving wireless signals from the access system. Non-limiting examples include a mobile station (MS) such as a mobile phone or a smart phone, a portable computer provided with a wireless interface card or other wireless interface facility, personal data assistant (PDA) provided with wireless communication capabilities, or any combinations of these or the like.

Figure 2:
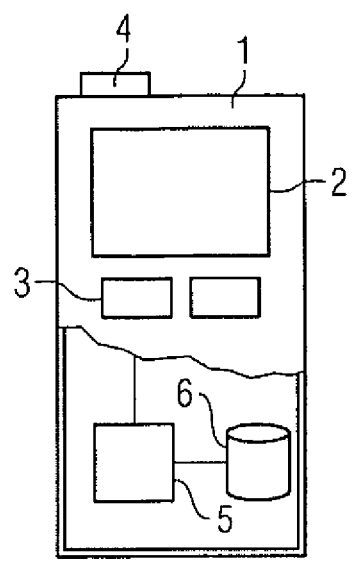
FIG. 2 shows a sectioned view of communication user equipment.

As shown in FIG. 2, a communication device 1 is typically provided with appropriate data processing apparatus, such as at least one data processor 5. At least one memory device 6 is also typically provided. The data processing and storage entities can be provided on an appropriate circuit board and/or in chipsets. Different functions and operations may be provided by different chips. Alternatively, at least partially integrated chips may be used. Antenna means 4, a display 2, and/or a keypad 3 may also be provided.

From a delay perspective, it would be preferable to have very frequent SR occurrences (i.e. low SR periodicity) to improve the uplink scheduler response time. This could be viewed as the time between the arrival of a data packet into the UE buffer and the first (e.g. HARQ) transmission of the same data packet on the Physical Uplink Shared Channel (PUSCH). The data packet can be for instance a VoIP packet in VoIP applications. On the other hand, low SR periodicity leads to high usage of the limited PUCCH resources. In addition, transmission of a SR when not needed by the uplink packet scheduler causes unnecessary interference in the PUCCH SR region (both intra- and inter-cell).

Known methods of dealing with such issues (preventing the transmission of SRs unnecessarily) include varying the SR periodicity whereby there is defined a maximum number of SRs that can be triggered without receiving an UL grant, designated dsr-TransMax. By decreasing SR occurrences, one can reduce the SR overhead, but at the same time this increases the uplink scheduler response time, for example at the beginning of a periods where there is high/frequent transmission of data packets, such as during voice activity periods in case of VoIP application. This can cause (e.g. the voice) quality to fall below an acceptable level. On the other hand, the parameter dsr-TransMax is provided to prevent a UE that lost UL synchronization from continuously transmitting SRs in uplink. Therefore when dsr-TransMax is reached and no UL grant for data transmission on PUSCH has been received, the UE releases PUCCH (SR) resources and initiates a random access procedure Therefore, neither varying the SR periodicity nor dsr-TransMax overcomes all the problems.

As mentioned previously, "bursty" data applications are troublesome in that they can cause the user equipment to almost continuously trigger and transmit SRs. A typical example of a "bursty" data application is one where there is a frequent transmission of small packets such as Voice Over IP (VoIP). The uplink packet scheduler has general information on the VoIP traffic pattern in uplink (e.g. one VoIP packet of approximately N bits may be generated every 20 ms), where N would depend on the Adaptive Multi-Rate (AMR), codec rate, type of IP header compression method etc. Therefore with such applications as VoIP traffic, the uplink scheduler (located in the eNode B) only in principle needs to know when a voice activity period begins and when it ends, so that during periods of inactivity, radio resources can be allocated to other users. Whilst the beginning of a such a quiet period (e.g. voice inactivity periods) can be determined by appropriate monitoring e.g. of voice activity, a SR transmitted by the UE can also identify the beginning of a voice activity period.

Sending SRs during, e.g. voice activity periods, is not very useful. It can be assumed that during voice activity periods there will always be data to be scheduled. For example, the uplink packet scheduler (e.g. located in the Node B) only needs to receive a SR at the beginning of a voice activity period in order to identify the start/end of a voice activity period.

The embodiments of the invention impose various restrictions on the triggering/transmission and/or reception of a SR in uplink, and are hereinafter generally termed suppression of SR transmission/reception.

Example 1

In one embodiment, a restriction is imposed on transmitting and triggering scheduling requests such that a new SR may not be transmitted (or will be ignored) if an SR was previously transmitted on the PUCCH within the last $NB_{TB}$ Time Transmission Intervals (TTI) or sub-frames, where $NB_{TB}$ is an integer.

In this embodiment a network element (e.g. the user equipment) will keep a record of when the last SR was transmitted/received and will determine the number of TTIs which have elapsed since. If this number exceeds a certain integer value $NB_{TB}$, then a SR can be triggered and transmitted uplink. If not then the user equipment will not send any SRs. In other words SR are suppressed even under conditions where SR would conventionally be sent.

The integer $NB_{TB}$ may be pre-set or it may be dynamically varied according to various factors such as resources, base station load etc. It may be set by the user equipment or the base station (eNB) or a network controller.

Figure 3:
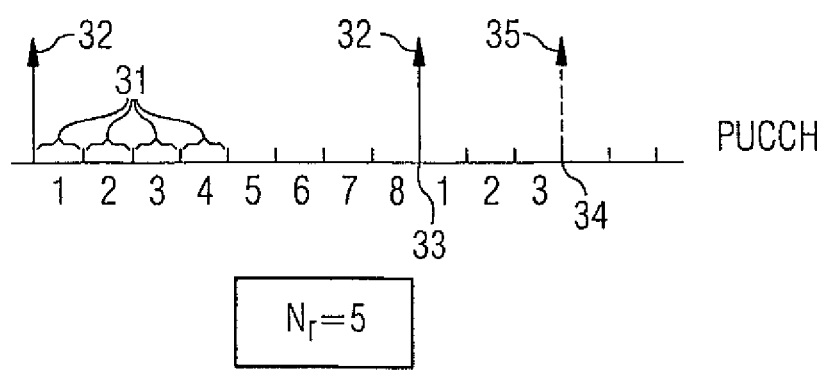
FIG. 3 illustrates one particular embodiment of reducing the volume of SRs.

FIG. 3 shows a schematic representation illustrating an example of this embodiment. A number of TTIs 31 are shown in relation to the PUCCH channel. It is to be noted that SR resources may not be available on PUCCH in every sub-frame; the minimum SR periodicity is 5 ms in E-UTRA Rel'8 In the first TTI, a SR is transmitted by a user equipment as indicated by the upward arrow 32. After 8 TTIs have elapsed, at time 33, certain conditions cause a UE to decide to send a SR. This may be for example caused by a buffer status report being triggered and where the UE has no allocation available on the PUSCH. In the example the value of $NB_{TB}$ is 5, that is the number of TTI that have to have lapsed since the last SR was sent, before another one can be sent. At time point 33, as at least 5 TTIs have elapsed before the last SR has been sent, so a further SR 32 can be sent.

At 34, conditions are such that under normal circumstances another SR would be sent. However as only 3 TTIs have elapsed since the last SR was sent; the user equipment does not send another SR. The dotted arrow 35 represents a SR which is not transmitted, despite the fact that it would have been transmitted should the restriction not have been in place.

With such embodiments, a low periodicity (i.e. low latency/response time) can be achieved whilst reducing the actual transmission of SRs. Previously SR periodicity was increased by merely controlling the periodicity of SR occurrences.

Example 2

In some embodiments, periods of high traffic/data transmission are identified; (e.g. spurts of bursty traffic such as in voice traffic). This may be for a particular user equipment. During such times the transmission of SRs for that user equipment is suppressed. The advantages of such embodiments is that under such conditions, a user equipment and/or base station will be prevented from devoting time to transmitting/receiving SRs. Generally the pattern of data transmission, which may be generally already known by network elements, may be used to determine whether SRs are to be suppressed (e.g. by identifying the start/end of periods of high traffic). For example the start and end time of voice spurts in VoIP can be detected; during these periods transmission of SRs are suppressed.

The skilled person would be aware of the various particular methods that can achieve this. For example in the circumstances mentioned above, during periods of high data transmission, more resources would be allocated e.g. by issuing more UL grants. In one particular embodiment therefore, a suppression of SRs may be imposed if there have been frequent UL grants. For example, a SR may not be triggered/transmitted if an uplink grant was issued to a particular user equipment within the last $NB_{GB}$ Time Transmission Intervals (TTIs), where $NB_{GB}$ is an integer number. A network element, usually this would be the user equipment, may keep a record of when the last uplink grant was issued or acted upon and a count is made of the number of TTIs which have elapsed since this time. If this number is less than a designated integer $NB_{GB}$, then a SR will be prevented from being transmitted by the user equipment. The restriction imposed by this embodiment means the eNodeB can for example avoid the triggering and transmission of an SR by a UE during voice activity periods in case resources for VoIP are scheduled using dynamic scheduling. In dynamic scheduling, the UE transmits the SR but the eNodeB can avoid the triggering of a SR in the UE by appropriately setting of parameters. Dynamic scheduling means that resources on PUSCH are allocated using PDCCH (Physical Downlink Control Channel) on a subframe basis. This is in contrast to semi-persistent scheduling where PUSCH resources are semi-persistently allocated (i.e. for a longer period than one sub-frame) using one UL grant on PDCCH.

Figure 4:
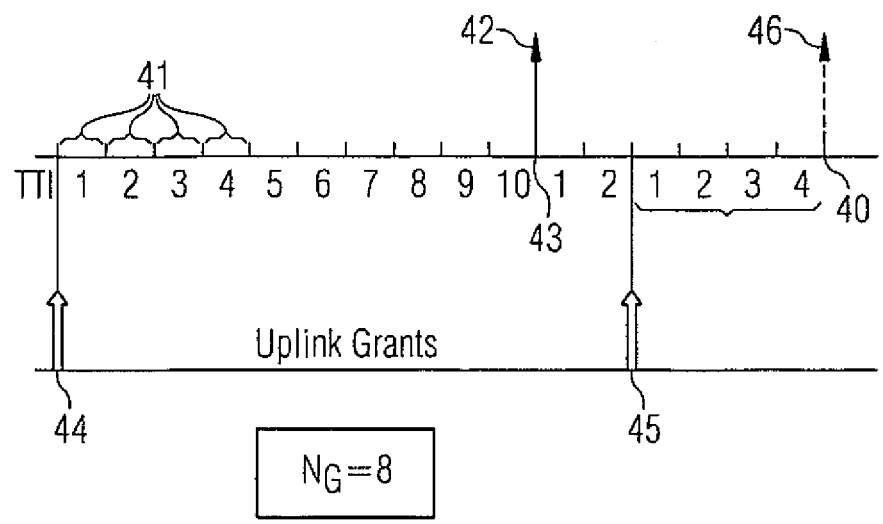
FIG. 4 illustrates a further embodiment to reduce the volume of SRs.

FIG. 4 shows a schematic representation illustrating an example of one such embodiment. A number of TTIs 41 are shown as before. The lower line shows the time line in relation to uplink grants 44, 45, designated by thick arrows. The top line indicates the PUCCH as before. In the first TTI (TTI1) an uplink grant 44 has been issued. After 10 TTIs have elapsed at point 43, conditions are such that cause a SR to be transmitted (again an example may be that the buffer status report is triggered as well as new data arriving in an empty buffer). In this example $NB_{GB}$, the number of TTIs which must have elapsed since the last Uplink Grant before a further SR can be transmitted is set at a value of 8. As 10 TTIs have elapsed since the last uplink grant has been issued to the particular UE, and this is greater than 8, so a SR 42 can be sent. At a time 45, another Uplink grant is issued. At a time point 40, conditions are again in place such that a SR would be transmitted. However as the number of TTIs which have elapsed has since this point is 4, this being less than the 8 required, a further SR is not transmitted at this point; the un-transmitted SR shown by dotted arrow 46.

Again the value of $NB_{GB}$ can be set or may vary dynamically according to prevailing conditions such as base station resources available, traffic type, cell load, etc. This embodiment is useful in VoIP applications for example, where in effect the transmission of SRs is switched off during voice activity periods, where it is clear to the uplink scheduler that it has decided to issue frequent uplink grants due to the high data transmission requirements.

Effectively information on the traffic pattern can be used (e.g. by the scheduler) to determine if a SR is to be suppressed. If it is decided there is high traffic from a particular user equipment, more resources will be allocated (e.g. by issuing more UL grants), and under these circumstances, time and resource will not be devoted to transmitting/accepting SR or allocating resource for them to be sent.

The advantages of embodiments is that they leads to a decrease in the generated interference (both intra- and inter-cell). Another potential advantage of applying such restriction for VoIP applications, is the higher Discontinuous Downlink Reception (DRX) gain when DRX is deployed in the presence of VoIP traffic. The invention however is not limited to VoIP applications.

In a further embodiment; where an SR is to be suppressed, the transceiver of a user equipment may be deactivated/switched off for a short periods. In other words the transceiver function may be intermittent and not used during such times of SR suppression.

Figure 5:
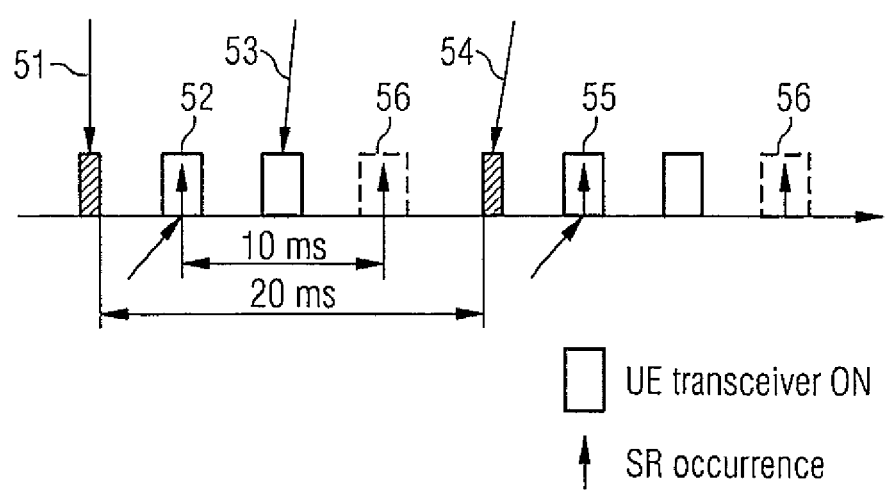
FIG. 5 illustrates a further embodiment of how SRs may be suppressed.

FIG. 5 shows a further embodiment illustrating intermittently switching on/off the transceiver to suppress the transmission of scheduling requests. The example shown is in relation to suppressing SR e.g. during voice activity periods of a VoIP call, but the principle can be applied any data transmissions. At 51 a VoIP Packet arrives in an empty buffer. At 52 a SR is transmitted. At 53, UL allocation is made and the VoIP packet is transmitted uplink. After this time there is no further need to transmit any new packets. At 56 there is an SR occurrence but since there is no data in the buffer, no SR is transmitted. This is prevented by the transceiver being switched off during this period. The SR is suppressed by the UE transceiver being switched off or de-activated during this period. In other words an SR packet can be prevented form being transmitted by the use of a "SP prohibit timer". At 54 a new VoIP packet arrives in an empty UE buffer and thus at 55 another SR is made on PUCCH. The time interval between packets arriving in the buffer of the UE is 20 milliseconds. During periods 51, 52, 53, 54 the UE transceiver is on (as indicated by the boxes), at other times it is off. At point 56 the UE may have sent out SRs but as it has been already determined that these are unnecessary the UE transceiver is switched off.

Example 3

Semi persistent scheduling (SPS) is a technique where a periodic UL transmission resource is allocated e.g. during the periods where there a lot of uplink traffic such as "talk-spurts" during bursty traffic. The same resource is allocated each time. The resource allocation is turned on during each of the talk-spurts and off between talk-spurts. In this manner, explicit signalling to request an allocation, and to grant a particular VoIP allocation is not required.

In one embodiment, a SR should not be transmitted as long as an SPS grant is configured; ie. during the periods designated with high traffic (e.g. during the talk spurts). In this embodiment, such a restriction achieves the same results as before.

Whether or not the UE has to apply this restriction may be configurable by the eNodeB.

Example 4

In one alternative embodiment, SRs may be suppressed by SR masking on a logical channel basis. For each logical channel that is configured by the eNB, a new parameter is introduced which tells the UE whether an SR should be triggered when new data arrives on that logical channel. When data arrives in a logical channel (and that data is of higher priority than the data already awaiting transmission in the other logical channels) a buffer status report is triggered. If the UE does not have any uplink resources to send that buffer status report a scheduling request is triggered. In one embodiment a mechanism is added setting a condition that the logical channel is also allowed to trigger an SR. The condition may be set as a parameter. In the examples below the parameter is designated as SPS-SRmask The following is an example of such an embodiment. The Scheduling Request (SR) is used for requesting UL-SCH resources for new transmission. When an SR is triggered, it shall be considered as pending until it is cancelled. All pending SR(s) shall be cancelled when a MAC PDU is assembled and this PDU includes a BSR which contains buffer status up to (and including) the last event that triggered a BSR or when the UL grant can accommodate all pending data available for transmission. According to one embodiment the following procedure is adopted:

If an SR is triggered and there is no other SR pending, the UE shall set the SR_COUNTER to 0.

As long as one SR is pending, the UE shall for each TTI:
if no UL-SCH resources are available for a transmission in this TTI:
if the UE has no valid PUCCH resource for SR configured in any TTI: initiate a Random Access procedure (see subclause 5.1) and cancel all pending SRs;
else if the UE has a valid PUCCH resource for SR configured for this TTI and if this TTI is not part of a measurement gap:
if SR_COUNTER<dsr-TransMax:
increment SR_COUNTER by 1;
if SPS-SRmask is set to true and a Semi-Persistent Scheduling uplink grant is not configured;
or if SPS-SRmask is not set to true:
instruct the physical layer to signal the SR on PUCCH;
else:
notify RRC to release PUCCH/SRS;
clear any configured downlink assignments and uplink grants;
initiate a Random Access procedure (see subclause 5.1) and cancel all pending SRs.

As far as buffer status reporting is configured; in one embodiment the following procedure may be adopted according to a further embodiment as follows:

If the Buffer Status reporting procedure determines that at least one BSR has been triggered since the last transmission of a BSR or if this is the first time that at least one BSR is triggered:
if the UE has UL resources allocated for new transmission for this TTI:
instruct the Multiplexing and Assembly procedure to generate a BSR MAC control element;
start or restart periodicBSR-Timer except when the BSR is a Truncated BSR;
start or restart retxBSR-Timer.
else if a Regular BSR has been triggered:
if the trigger was only that data became available for transmission:
if for at least one logical channel for which data became available for transmission logicalChannel-SRmask is not set to true:
a Scheduling Request shall be triggered.
else:
a Scheduling Request shall be triggered.

The above described functions can be provided by means of appropriate software and data processing apparatus. Functions may be incorporated into any appropriate network element or management system and may be provided by means of one or more data processors. The data processor may be provided by means of for example, at least one chip. Appropriate data processing may be provided in a processing unit provided in association with a communication device, for example a mobile station. The data processing may be distributed across several data processing modules. The above described functions may be provided by separate processors or by an integrated processor. An appropriately adapted computer program code product or products may be used for implementing the embodiments, when loaded on an appropriate data processing apparatus. The program code product for providing the operation may be stored on and provided by means of an appropriate carrier medium. An appropriate computer program can be embodied on a computer readable record medium. A possibility is to download the program code product to a communication device via a data network.

It is also noted that although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

We claim:

1. A method comprising: scheduling resources comprising transmitting scheduling requests from a first entity to a second entity; determining that a number of Time Transmission Intervals or sub-frames that have elapsed since a previous scheduling request is less than a predetermined integer value and that an uplink requirement exceeds a certain level based on identified start or end periods of data spurts in bursty traffic; and based on determining that the number of elapsed Time Transmission Intervals or sub-frames is less than the predetermined integer value and that the uplink requirement exceeds the certain level, suppressing a transmission of at least one of the scheduling requests.

2. The method as claimed in claim 1, wherein the first entity is a user equipment and the second entity is a base station.

3. The method as claimed in claim 1, wherein the transmitting the scheduling request is made via a Physical Uplink Control Channel of an E-UTRA system.

4. The method as claimed in claim 1, further comprising allocating a same periodic uplink transmission resource during the identified periods of the data spurts in the bursty traffic, wherein the same periodic uplink transmission resource is turned on during the periods of the data spurts and turned off between the periods of the data spurts.

5. The method as claimed in claim 1, wherein said bursty traffic is voice traffic or VoIP data packets.

6. The method as claimed in claim 1, wherein the transmission of the at least one scheduling request is suppressed in response to a number of Time Transmission Intervals or sub-frames that have elapsed since a last Uplink Grant being less than the predetermined integer value.

7. The method as claimed in claim 1, wherein said predetermined integer value varies according to a traffic type, a base station or cell load, or a periodicity of buffer status reports associated with the at least one of the scheduling request.

8. The method as claimed in claim 1, wherein suppressing the transmission of the at least one scheduling request comprises not transmitting or not triggering the at least one scheduling request.

9. The method as claimed in claim 1, wherein suppressing the transmission of the at least one scheduling request comprises intermittently turning on or intermittently turning off the transceiver of said first entity.

10. The method as claimed in claim 1, wherein a plurality of sub-frames for transmission of the scheduling requests relate to the Physical Uplink Control Channel or the Physical Downlink Control Channel.

11. A computer program product comprising a non-transitory computer-readable medium storing instructions for execution by one or more processors, wherein the computer-readable medium includes instructions for performing at least the following: scheduling resources comprising transmitting scheduling requests from a first entity to a second entity; determining that a number of Time Transmission Intervals or sub-frames that have elapsed since a previous scheduling request is less than a predetermined integer value and that an uplink requirement exceeds a certain level based on identified start or end periods of data spurts in bursty traffic; and based on determining that the number of elapsed Time Transmission Intervals or sub-frames is less than the predetermined integer value and that the uplink requirement exceeds the certain level, suppressing a transmission of at least one of the scheduling requests.

12. A user equipment comprising: one or more processors and one or more memories including computer program code, the one or more memories and the computer program code being configured, with the one or more processors, to cause the user equipment to perform at least: scheduling resources comprising transmitting scheduling requests from a first entity to a second entity; determining that a number of Time Transmission Intervals or sub-frames that have elapsed since a previous scheduling request is less than a predetermined integer value and that an uplink requirement exceeds a certain level based on identified start or end periods of data spurts in bursty traffic; and based on determining that the number of elapsed Time Transmission Intervals or sub-frames is less than the predetermined integer value and that the uplink requirement exceeds the certain level, suppressing a transmission of at least one of the scheduling requests.

13. A base station comprising: one or more processors and one or more memories including computer program code, the one or more memories and the computer program code being configured, with the one or more processors, to cause the base station to perform at least: scheduling resources comprising transmitting scheduling requests from a first entity to a second entity; determining that a number of Time Transmission Intervals or sub-frames that have elapsed since a previous scheduling request is less than a predetermined integer value and that an uplink requirement exceeds a certain level based on identified start or end periods of data spurts in bursty traffic; and based on determining that the number of elapsed Time Transmission Intervals or sub-frames is less than the predetermined integer value and that the uplink requirement exceeds the certain level, suppressing a transmission of at least one of the scheduling requests.

14. The user equipment as claimed in claim 12, wherein the one or more memories and the computer program code are further configured, with the one or more processors, to cause the user equipment to perform at least: one of sending and receiving the scheduling requests via a Physical Uplink Control Channel of an E-UTRA system.

15. The user equipment as claimed in claim 12, wherein the one or more memories and the computer program code are further configured, with the one or more processors, to cause the user equipment to perform at least: analyzing an uplink traffic pattern to identify a link requirement.

16. The user equipment as claimed in claim 12, wherein the one or more memories and the computer program code are further configured, with the one or more processors, to cause the user equipment to perform at least: allocating a same periodic uplink transmission resource during the identified periods of the data spurts in the bursty traffic, wherein the same periodic uplink transmission resource is turned on during the periods of the data spurts and turned off between the periods of the data spurts.

17. The user equipment as claimed in claim 12, wherein said bursty traffic is voice traffic or VoiP data packets.

18. The user equipment as claimed in claim 12, wherein the one or more memories and the computer program code are further configured, with the one or more processors, to cause the user equipment to perform at least: suppressing the at least one scheduling request in response to a number of Time Transmission Intervals or sub-frames that have elapsed since a last Uplink Grant being less than the predetermined integer value.

19. The user equipment as claimed in claim 12, wherein suppressing the transmission of the at least one scheduling request comprises intermittently turning on or intermittently turning off a transceiver.

20. The user equipment as claimed in claim 12, wherein a plurality of sub-frames for the transmission of the scheduling requests relate to the Physical Uplink Control Channel or the Physical Downlink Control Channel.

21. The user equipment as claimed in claim 18, wherein the predetermined integer value varies according to a traffic type, a base station or cell load, or a periodicity of buffer status reports associated with the at least one of the scheduling request.

* * * * *